United States Patent [19]
Ludder

[11] 3,971,471
[45] July 27, 1976

[54] CLOSE-NESTING, LIGHT-WEIGHT, ONE-PIECE DRINKING CUP AND APPARATUS FOR THE MANUFACTURE THEREOF

[75] Inventor: Rodney E. Ludder, Glen Head, N.Y.

[73] Assignee: Owens-Illinois, Inc., Toledo, Ohio

[22] Filed: Apr. 16, 1973

[21] Appl. No.: 351,561

[52] U.S. Cl.............................. 206/519; 206/520; 229/1.5 B
[51] Int. Cl.$^2$...................... B65D 21/02; B65D 1/16
[58] Field of Search................... 206/515, 519, 520; 229/1.5 B

[56] References Cited
UNITED STATES PATENTS

| | | | |
|---|---|---|---|
| 2,805,790 | 10/1957 | Smucker | 206/520 |
| 2,988,258 | 6/1961 | Witzke | 229/1.5 B |
| 3,298,893 | 1/1967 | Allen | 229/1.5 B |
| 3,363,820 | 1/1968 | Schilling | 206/515 |
| 3,375,954 | 4/1968 | Honkanen | 206/520 |
| 3,485,412 | 12/1969 | Hawley | 206/519 |
| 3,820,684 | 6/1974 | Harrison | 206/520 |

*Primary Examiner*—George E. Lowrance
*Attorney, Agent, or Firm*—David R. Birchall; Edward J. Holler

[57] ABSTRACT

A closely nestable one-piece cup molded from expanded or expandable beads of polystyrene, the cup sidewall having a major portion which extends from a point which is spaced no further from the larger, open end of the cup than the desired stacking space between like cups in a stack thereof and which gradually increases in its thickness and in its angle, relative to the vertical central axis of the cup, as it proceeds inwardly and downwardly toward the bottom of the cup. Also, a mold having spaced apart complementally-shaped concave and convex molding surfaces on molding members that are reciprocatable, relative to one another, into and out of closely spaced apart molding relationship to mold such a cup from expandable or expanded beads.

5 Claims, 2 Drawing Figures

CLOSE-NESTING, LIGHT-WEIGHT, ONE-PIECE DRINKING CUP AND APPARATUS FOR THE MANUFACTURE THEREOF

BACKGROUND OF THE INVENTION

One-piece, lightweight, disposable drinking cups molded from expanded or expandable beads of polystyrene have gained great favor in recent years for the service of coffee and other hot beverages because of their low cost and good thermal insulating characteristics. However, because it is necessary to maintain the spacing between the opposed mold surfaces in the molding equipment of the types commonly used to make such cups at some substantial multiple of the average size of the commercially available types of expanded or expandable beads from which such cups are molded, in order to get such beads to properly fill the molds, such cups are characterized by thick sidewalls, relative to other types of hot drink cups. Thus, because of the sidewall thickness characteristics of such cups, they cannot be nested within one another as closely together in stacks as other types of hot drink cups, and such cups, therefore, occupy considerably more space in shipment and storage than other hot drink cups. This fact has greatly limited the use of such cups in the sale of coffee from vending machines.

It has previously been proposed, in Belgium Pat. No. 777,675, that cups molded from expanded beads of polystyrene can be formed with a thinner section near the top or rim of each such cup, and which would, therefore, be near the bottom of the top-charged types of molding equipment conventionally used in molding cups from expandable beads in the inverted position. However, the reduction in stacking height which can be achieved by the use of the configuration of the aforesaid Belgium Patent is limited by the minimum sidewall thickness required near the bottom of such cups, which is somewhat greater than the thickness required at the top thereof.

GENERAL DESCRIPTION OF THE INVENTION

In accordance with the present invention, however, the required stacking height in one-piece cups molded from expanded or expandable beads of polystyrene foam of the type described in the aforesaid Belgium Patent, can be further reduced by increasing the angle of the sidewall as it tapers gradually from its upper, thinner section to its lower thicker section, the required change in sidewall angle not being sufficiently great to detract from other important properties of the cup such as stability, capacity, appearance or formability. For example, to accommodate to an increase in sidewall thickness of the order of two to one over the length of the sidewall which is overlapped by the next cup in a nested stack, it is only necessary to gradually change the angle of the sidewall, relative to the vertical central axis of the cup, from an angle of the order of 5° at the uppermost, thinnest section in such portion of the sidewall to an angle of the order of 20° at the lowermost, thickest section of such sidewall portion, to maintain acceptable clearance between the sidewalls of adjacent cups in a stack along all portions of the overlapped lengths thereof.

Accordingly, it is an object of the present invention to provide an improved one-piece lightweight nestable cup. More, particularly, it is an object of the present invention to provide a nestable, one-piece cup which is molded from low density beads of a thermoplastic material and which has improved stacking characteristics with like cups. It is a further object of the present invention to provide improved apparatus for molding nestable one-piece cups from expanded or expandable beads of a thermoplastic material.

For a further understanding of the present invention and the objects thereof, attention is directed to the drawing and following description thereof, to the detailed description of the invention and to the appended claims.

DETAILED DESCRIPTION OF THE INVENTION

Figure 1:
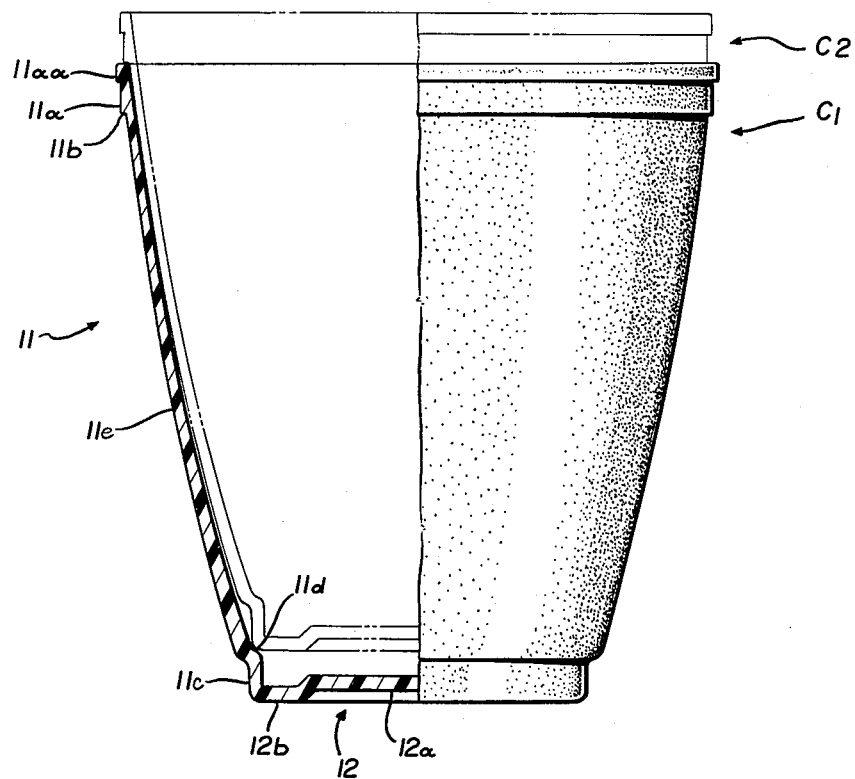
FIG. 1 is a vertical elevational view, partly in cross-section, of a preferred embodiment of a one-piece nestable drinking cup in accordance with my invention, with a like cup nested internally thereof being shown in broken line.

FIG. 1 illustrates a nestable cup or container C1 according to the present invention, such cup or container, which may be considered to be circular in horizontal cross-section, comprising a sidewall portion, indicated generally at 11 and a bottom wall portion, indicated generally at 12. To indicate the close-nesting relationship which exists between cup C1 and like cups in a closely nested stack during shipment and storage, a second cup C2, made to the same specifications as cup C1, is shown, in broken line, inserted in cup C1 in closely nested relationship therewith.

Cup C1 is of one-piece, seamless construction, with sidewall portion 11 being integrally formed with bottom wall portion 12. Such cups may be inexpensively manufactured on a sustained and rapid basis, as is known in the art, by fusing discrete beads of an expanded or expandable thermoplastic material in so-called steam chest molding equipment, cups made from fused expanded beads of general purpose polystyrene in densities as low as 5 pounds per cubic foot being very well suited and very widely used for the service of single servings of hot beverages such as coffee in 6–12 ounce capacity sizes.

So that a cup C1 will rest with stability on a flat surface, bottom wall 12 is provided with a radially inwardly major portion 12a which is upwardly offset, leaving a lower minor annular portion 12b to serve as a bearing ring which is adapted to rest on such a flat surface.

Sidewall 11 of cup C1 has a relatively shallow thickened section 11a extending from the rim or upper open mouth of the cup and which terminates at its lower end in an outwardly projecting shoulder 11b at an elevation spaced below such rim or mouth by an amount no greater than, and preferably equal to the desired stacking height or distance between similar cups nested together in a stack thereof, shoulder 11b thereby being adapted to rest on the upper rim or mouth of a cup like cup C1 and in which cup C1 may be nested when such distance is equal to the desired stacking height of such cups. The thickened portion 11a of cup C1 also serves to stiffen the open mouth of the cup against radially inwardly applied loads, of the type which occur when the cup is grasped in the hand of the ultimate user, and to that end, may be provided with a further thickened portion 11aa at the upper extremity thereof.

Sidewall 11 of cup C1 also has a relatively shallow, radially inwardly offset vertical section 11c which extends upwardly from the bottom end of the cup and which terminates in a radially inwardly projecting shoulder 11d at an elevation spaced above the bottom by an amount no more than, and preferably equal to, the desired stacking height or distance between the rims of similar cups nested together in a stack thereof, shoulder 11d thereby being adapted to be rested upon by the bottom of a cup like cup C1, such as cup C2, which may be nested therein. While it is possible to properly nest like cups with only one of the stacking shoulders, 11b or 11d as heretofore described, both shoulders may readily be provided and, together, they serve to increase the resistance of a stack of such cups to jamming under impact or other loads acting parallel to the vertical central axes of such cups over a stack of cups having only one or the other of such shoulders.

Sidewall 11 of cup C1 also has a major portion 11e extending downwardly and inwardly between portions 11a and 11c, from shoulder 11b to shoulder 11d in the illustrated embodiment. As is described in the aforesaid Belgium Pat. No. 777,675, this portion of the sidewall of a cup molded from expanded beads may advantageously be constructed with a gradually increasing thickness as it approaches the bottom of the cup. In such Belgium Patent, however, this portion is constructed in the shape of a frustum of a cone, and the effect of the tapered wall thickness in such a configuration is to greatly increase the clearance between overlapped portions of the sidewalls of nested cups at the top portions of adjacent cup from that at the bottom portions of such cups. This variation in clearances can be very substantially and advantageously reduced, in accordance with the present invention, by gradually increasing the angle of portion 11e, relative to the vertical central axis of the cup, as the thickness thereof increases. This will also permit a very substantial reduction in stacking height between like cups nested together, since a greater wall taper at the bottom, thicker section of the cup, will offset the adverse effect of a thicker wall on stacking height, as is explained in copending application Ser. No. 211,259 of Stephen W. Amberg and Thomas E. Doherty, which is assigned to the assignee of this application, now U.S. Pat. No. 3,854,583. For example, in hot drink cups of a size commonly used to serve a single serving of a beverage such as coffee, the wall thickness of cups made from fused beads of expanded, general purpose polystyrene of a density of five pounds per cubic foot require a gradual change in the angle of sidewall portion 11e of from an angle of the order of 5° at the elevation of shoulder 11b to an angle of the order of 20° to accommodate a two to one increase in wall thickness over this distance, say from 0.045 inch at the top of portion 11e to 0.090 inch at the bottom thereof.

In drinking cups having a relatively conventional overall height to rim outside diameter ratio of about 1.05, the required gradual change in sidewall angle can be readily achieved by shaping the major portion 11e of sidewall 11 so that its inner surface, along a vertical plane on which the vertical central axis of the cup lies, corresponds to the arc of a circle whose radius is approximately 4.7 times the outside diameter of the cup rim. Such a relationship between wall thickness and wall angle will result in a gradually increasing clearance between adjacent walls of nested cups, as measured in a direction normally thereof, from a clearance of the order of 0.002 inch at the top thereof to a clearance of the order of 0.009 inch at the bottom thereof. The stacking height of nested cups, or the rim to rim spacing therebetween, will be of the order of 0.337 inch (slightly less than ⅜ inch) which is considerably smaller than that which can be practically obtained between like cups of the type described in the aforesaid Belgium Patent.

Figure 2:
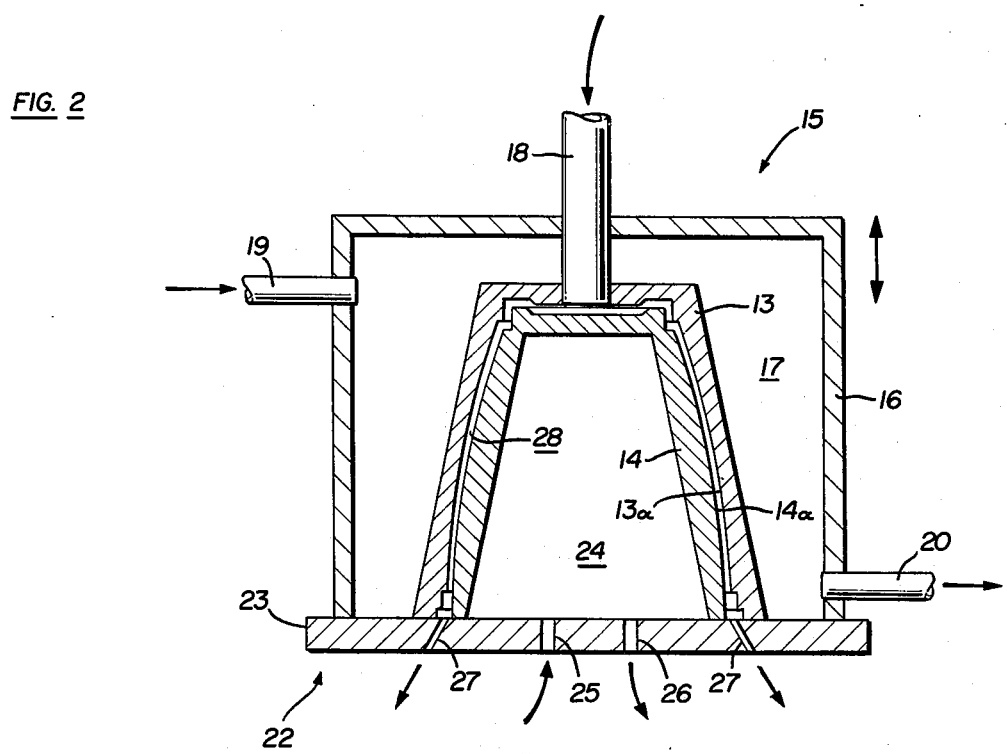
FIG. 2 is a vertical sectional view, at a somewhat reduced scale from that of FIG. 1, of molding apparatus of a type which may be used to mold drinking cups of the type shown in FIG. 1.

A cup of the type shown in FIG. 1 may be made by equipment of the type shown in FIG. 2, such equipment comprising spaced apart molding members 13 and 14 whose inner and outer molding surfaces are complementally shaped to correspond, respectively, to the outer and inner surfaces of a cup to be formed therein, in inverted position, when the molding members are in the position shown in the drawing. Thus, in order to form the sidewall portion 11e of cup C1, the molding surfaces of molding members 13 and 14 are respectively provided with complementally shaped, concave and convex portions 13a and 14a, and the spacing between these concave and convex portions, when molding members 13 and 14 are in the closed, molding position shown in the drawing, gradually decreases as the diameters of the molding surfaces increase at various horizontal elevations along the axial length thereof.

Molding member 13 is part of reciprocatable structure, indicated generally by numeral 15, and structure 15 also comprises wall means 16, which defines a chamber 17 with molding member 13, and conduits 18, 19 and 20. Structure 15 is movable away from bottom structure of which molding member 14 is an element, indicated generally by numeral 22, to permit removal of a molded cup from the space between molding members 13 and 14, and is movable back to the position shown in the drawing to begin a new cup molding cycle. Structure 22 also comprises a base element 23 which defines a cavity 24 with the interior of mold member 14, and base element 23 is provided with ports 25 and 26 extending therethrough into cavity 24 and a circumferential series of ports 27 extending therethrough into the molding cavity 28, defined by the spaced apart inner and outer molding surfaces of molding members 14 and 13.

The cycle for molding a cup in the apparatus depicted in FIG. 2 may be considered to begin at the point in time immediately after structure 15 has been returned to the position shown in the drawing, it having previously been removed from such position to facilitate removal of a previously formed cup. At this point in time, a metered charge of pre-expanded or substantially pre-expanded beads of an expandable thermoplastic material, such as general purpose polystyrene, will be charged into cavity 28 through conduit 18 to substantially fill such cavity. During this time, ports 27 will be connected to a source of vacuum to help the beads flow evenly into the cavity. After the beads are in place in cavity 28, steam will be passed through cavity 17 and cavity 24 to heat the beads in cavity 28 to cause them to fuse together, and to undergo any further expansion required to completely fill the cavity. Fresh steam enters cavity 17 through conduit 19 and spent steam is exhausted therefrom through conduit 20. Likewise, fresh steam enters cavity 24 through port 25 and spent steam is exhausted therefrom through port 26. After the beads in cavity 28 have fused together to form a cup, the cup is cooled to a rigid, self-sustaining temperature in the cavity by causing cooling water to flow through cavity 17, by way of conduits 19 and 20, and through cavity 24, by way of ports 25 and 26. Thereupon, the structure 15 is lifted from the position shown in the drawing to permit removal of the newly formed cup, and the apparatus is now ready to begin a repeat of the cycle to make yet another cup.

The best mode known to me to carry out this invention has been described above in terms sufficiently full, clear, concise and exact as to enable any person skilled in the art to make and use the same. It is to be understood, however, that it is within my contemplation that certain modifications of the above-described mode of practicing the invention can be made by a skilled artisan without departing from the scope of the invention and it is, therefore, desired to limit the invention only in accordance with the appended claims.

What is claimed is:

1. A one-piece, seamless drinking cup of nestable configuration, and of a size adapted to contain a single serving of a hot beverage, said cup comprising a sidewall tapering inwardly and downwardly over a major portion of its extent from the upper open mouth thereof, and a bottom wall formed integrally with the sidewall and extending thereacross at the lower end thereof, the sidewall and the bottom wall being formed from fused beads of an expanded thermoplastic material, which consists essentially of general purpose polystyrene whose density is not materially greater than 5 pounds per cubic foot, the sidewall gradually increasing in thickness over said major portion, as it extends downwardly thereof, said major portion extending from a first elevation near the upper open mouth of the cup to a second elevation near the lower end thereof and gradually increasing in its angle, relative to the vertical central axis of the cup, from a small acute angle at the first elevation to a larger acute angle at the second elevation to maintain adequate, but not excessive, clearances between all portions of the overlapped major portions of the sidewalls of a pair of such cups closely nested together, said cup being circular in horizontal cross-section at all elevations along said major portion, the ratio of the overall height to the outside diameter of the upper open mouth of said cup being of the order of 1.05, the thickness of said major portion of the sidewall at the second elevation being of the order of 2.0 times the thickness at the first elevation, and the inside surface of the major portion, along a vertical plane on which the vertical central axis of the cup lies, corresponding to the shape of an arc of a circle whose radius is of the order of 4.7 times greater than the outside diameter of said upper open mouth of the cup, the distance from the upper open mouth of the cup to the first elevation and the distance from the second elevation to the lower end of the cup each being equal to the desired stacking height between like cups closely nested together, the sidewall of said cup being provided with a thickened portion which extends for the length of such distance from the upper open mouth of the cup to the first elevation and which defines a horizontally outwardly projecting shoulder which is adapted to rest on the upper open mouth of a like cup when such cup is inserted in said like cup in closely nested relationship, the sidewall of the cup also being provided with a radially inwardly offset vertical section which extends for the length of the distance from the second elevation to the lower end of the cup and which defines a horizontally inwardly projecting shoulder on which the lower end of a like cup is adapted to rest when said like cup is inserted in said cup in closely nested relationship, the thickness of the sidewall at the first elevation being not materially greater than 0.045 in., the distance from the upper open mouth of the cup to the first elevation being no greater than ⅜ inch.

2. The combination comprising a one-piece seamless drinking cup according to claim 1 and a like cup in which said cup is inserted in closely nested relationship, the outwardly projecting shoulder of said cup resting on the upper open mouth of said like cup.

3. The combination according to claim 2 wherein the clearance between adjacent overlapped portions of the major portions of the sidewalls of said cup and said like cup is not materially less than 0.002 inch and is not materially greater than 0.009 inch, as measured along a direction generally perpendicular to said adjacent overlapped portions.

4. The combination comprising a one-piece, seamless drinking cup according to claim 1, and a like cup inserted in said cup in closely nested relationship, the lower end of said like cup resting on said inwardly projecting shoulder of said cup.

5. The combination according to claim 1 wherein the clearance between adjacent overlapped portions of the major portions of the sidewalls of said cup and said like cup is not materially less than 0.002 inch and is not materially greater than 0.009 inch, as measured along a direction generally perpendicular to said adjacent overlapped portions.

* * * * *